United States Patent [19]

Kudo et al.

[11] Patent Number: 5,083,149
[45] Date of Patent: Jan. 21, 1992

[54] CAMERA

[75] Inventors: Yoshinobu Kudo; Yoshiaki Hata, both of Osaka, Japan

[73] Assignee: Minolta Camera Kabushiki Kaisha, Osaka, Japan

[21] Appl. No.: 509,296

[22] Filed: Apr. 16, 1990

[30] Foreign Application Priority Data

Apr. 17, 1989 [JP] Japan .................................. 1-96865
Apr. 17, 1989 [JP] Japan .................................. 1-96866

[51] Int. Cl.⁵ .................... G03B 7/099; G03B 9/08; G03B 13/04; G03B 13/36
[52] U.S. Cl. ................... 354/402; 354/479; 354/199; 354/219; 354/233; 354/236
[58] Field of Search ................. 354/402–409, 354/155, 195.1, 195.12, 199, 200, 201, 219, 233, 236, 476, 477, 478, 479; 352/140; 358/227

[56] References Cited

U.S. PATENT DOCUMENTS 3,504,610  4/1970  Dönitz .................................. 354/404
3,860,935  1/1975  Stauffer .............................. 354/407
4,684,995  8/1987  Baumeister ........................ 358/227
4,853,731  8/1989  Tsujimura et al. ......... 354/195.1 X

OTHER PUBLICATIONS

*Modern Photography*, pp. 50–56, Apr. 1989.
*Modern Photography*, pp. 44–54, May 1986.
*Modern Photography*, pp. 27–30, Mar. 1988.

Primary Examiner—W. B. Perkey
Attorney, Agent, or Firm—Burns, Doane, Swecker & Mathis

[57] ABSTRACT

A camera having a photographing optical system including photographing lenses capable of carrying out a zooming, a viewfinder optical system composed of an optical system different from those of the photographing lenses, a photometric system having an optical system different from those of the photographing lenses, and a focus condition detecting system for detecting the focus condition of an object based on a light which has passed through the photographing lenses.

22 Claims, 10 Drawing Sheets

CAMERA

BACKGROUND OF THE INVENTION

1. Field of the Invention

The present invention relates to a camera having a function of automatically detecting a focusing condition and a function of automatically performing an exposure, and more particularly, to a camera having a system capable of automatically focusing by using a light which passes through the photographing lens (TTL system).

2. Description of the Related art

As well known, cameras commercially available are classified into a single-lens reflex camera and an non-single-lens reflex camera in terms of the construction of the viewfinder thereof. The latter includes a camera generally called a compact camera.

The single-lens reflex camera has features or advantages that an object image observed in the viewfinder coincides with an object to be photographed; a focusing condition is viewable in the viewfinder; and a zoom lens or a lens having long focal length can be exchangeably mounted thereon.

Recently, a single-lens reflex camera having a device which detects a focusing condition using a light which has passed through the photographing lens thereof is commercially available. This system is hereinafter referred to as TTL system. The TTL system is capable of accurately detecting a focusing condition. That is, the focus detecting device employing the TTL system detects, advantageously, a defocus amount in a predetermined focusing plane and is capable of detecting a focusing condition irrespective of an error in the mechanism of a camera or an error made by a temperature change.

Thus, the single-lens reflex camera currently available is advantageous in that it is capable of accurately obtaining the in-focus condition as a photographer desires, however, requires optical instruments such as a pentagonal prism and a mirror box. Thus, the camera is large-sized and heavy. Further, the movement of a quick return mirror causes the lens back of a photographing lens to be very long. Accordingly, the photographing lens is large-sized.

In the non-single-lens reflex camera currently available, a viewfinder optical system and an object distance measuring device are mounted in the camera body independently of a photographing optical system. This system is hereinafter referred to as non-TTL system. Further, the object distance measuring device adopts a zone focusing system. Although the non-single-lens reflex camera is inferior to the single-lens reflex camera in that it cannot take a photograph as faithfully as a photographer desires and cannot obtain a in-focus condition so accurately as the single-lens reflex camera does. However, the non-single-lens reflex camera is compact and is easy to handle. Further, since no quick return mirror is required, the lens back of the photographing lens can be considerably shortened. Therefore, the photographing lens is compact.

Recently, a zoom lens is increasingly mounted on an non-single-lens reflex camera. It is expected that a zoom lens having a high magnification and a long focal length is mounted on the non-single-lens reflex camera in the near future.

As described above, the object distance measuring device of the non-single-lens reflex camera adopts the non-TTL system and the zone focusing system. Therefore, if the photographing lens having a high magnification and a long focal length is mounted thereon, an in-focus condition cannot be accurately obtained.

That is, the non-TTL system does not detect an actual focusing condition. Therefore, if a mechanism for stopping a lens has an error, the error causes a picture to be out of focus. The mechanism of a camera is inevitably attended by such an error, which leads to an error in detecting a focusing condition. If the zone focusing system is employed, images of objects in the vicinity of an edge of the focus zone are not appropriately brought into focus. If a focal length of a photographing lens is long, a depth of field is very shallow. As such, the images of objects tend to be out of focus further.

In a camera having a variable focus lens in which a focusing lens is varied in its movement depending on the focal length thereof, a lens movement amount is determined as follows: A focal length region is divided into several areas. Then, the lens movement amount of the representative focal length in each of the divided areas is determined as a representative lens movement amount of each of the divided areas. Accordingly, a lens cannot be accurately moved in a focal length between the representative focal length of a certain area and the representative focal length of an adjacent area.

As described above, the known single-lens reflex and non-single-reflex cameras have both advantages and disadvantages.

SUMMARY OF THE INVENTION

Accordingly, an essential object of the present invention is to provide a camera having the advantages of both a single-lens reflex camera and a non-single-reflex camera, namely, a camera which is capable of accurately detecting a focusing condition and can be manufactured as compactly as possible.

It is another object of the present invention to provide a small-sized camera which is provided with a preferable photometric device and capable of accurately carrying out a focus adjustment.

It is still another object of the present invention to provide a camera, capable of accurately carrying out a focus adjustment, having a novel device for guiding a light, which has passed through the photographing lens, to a device for carrying out a focus adjustment.

In accomplishing these and other objects, according to one preferred embodiment of the present invention, there is provided a camera comprising a photographing optical system which includes photographing lenses capable of performing a zooming; a viewfinder optical system composed of an optical system different from those of the photographing lenses; photometric means, having an optical system different from those of the photographing lenses, for performing a photometry of an object; and focus condition detecting means for detecting the focus condition of the object based on a light which has passed through the photographing lenses.

According to the above construction, light enters into the viewfinder optical system and the photometric means without passing through the photographing lens, namely, non-TTL system. Therefore, the camera has a construction similar to that of a known compact camera. Since TTL system is adopted in carrying out an automatic focusing operation, that is, since a focusing condition is measured using light which has passed through the photographing lens, the image of an object can be brought into focus with a high accuracy. Further, if a zoom lens is mounted on the camera, the image of the object can be accurately focused irrespective of the position of the zoom lens. Further, the object can be brought into focus without being influenced by an error of a lens or a mechanical error..

Comparing the camera according to the present invention with the known non-single-lens reflex camera (compact camera), the following advantages can be obtained:

(1) An object can be brought into focus with a higher accuracy.

(2) An error amount in bringing the image of an object into focus is smaller without being influenced by a lens error or a mechanical error.

(3) The use of a variable focus lens can be easily applied to the camera according to the present invention.

Additionally, comparing the camera according to the present invention with the known single-lens reflex camera, the camera is compact and can bring the image of an object into focus as accurately as the known single reflex camera. The reason the camera is small-sized is as follows: A pentagonal prism or a mirror is not required to be mounted in the camera because a light is directly incident on the viewfinder of the camera, which eliminates the need for the provision of a long lens back unlike in an ordinary single-lens reflex camera which requires a long lens back in consideration of the space for the pivotal movement of the mirror.

Thus, the present invention provides a camera having the superior characteristics of a known single-lens reflex camera and a non-single-lens reflex camera.

BRIEF DESCRIPTION OF THE DRAWINGS

These and other object and features of the present invention will become apparent from the following description taken in conjunction with the preferred embodiments thereof with reference to the accompanying drawings, in which.

DETAILED DESCRIPTION OF THE INVENTION

Figure 2:
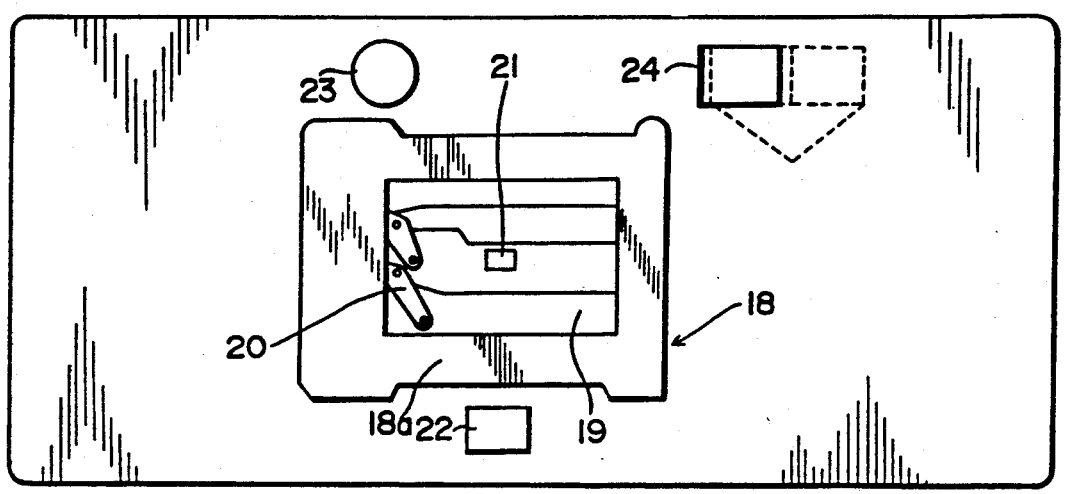
FIG. 2 is a front view showing the internal construction of the camera according to a first embodiment, a light intercepting shutter section being positioned immediately forward of a film.

Before the description of the present invention proceeds, it is to be noted that like parts are designated by like reference numerals throughout the accompanying drawings.

Figure 1:
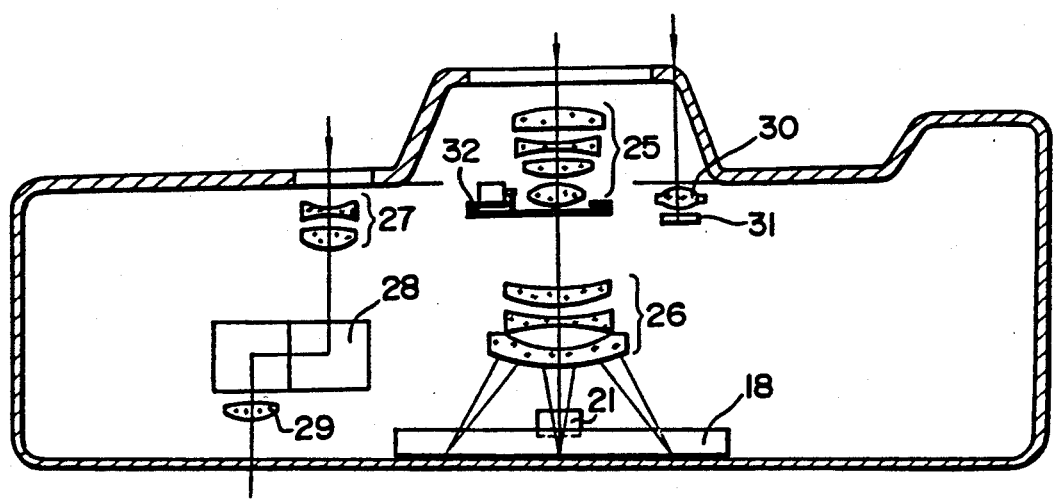
FIG. 1 is a section, viewed from the above, showing an internal construction of a camera according to a first embodiment of the present invention.

FIG. 1 is a section, viewed from the above, showing the internal construction of a camera body of a first embodiment of the present invention. Two groups of a forward photographing lens 25 and a backward photographing lens 26 (hereinafter referred to as lenses 25 and 26) constituting a zoom lens move in a speed different from each other along the optical axis thereof. The forward lens 25 serves as a means for obtaining the in-focus condition, that is, the forward lens 25 is a focusing lens. In an objective lens 27 of a real image type viewfinder, positive and negative lenses move in a speed different from each other along the optical axis thereof so that the positive lens magnifies the image of an object and the negative lens performs a diopter correcting. Thus, a zooming is carried out. The detailed description of the mechanism of the lens 27 will be made later. A Porro prism 28 converts an inverted real image into an erect real image. The camera body further includes an eyepiece 29, a photometric lens 30, and a photometric element 31. One surface of the Porro mirror 28 of the viewfinder may be composed as a transparent surface or a semitransparent surface so that a photometry may be performed through part of the viewfinder. A member denoted by reference numeral 32 is a shutter/diaphragm mechanism. Mirror 21 for an automatic focusing mechanism is mounted in a light intercepting shutter 18 which will be described later.

Figure 4:
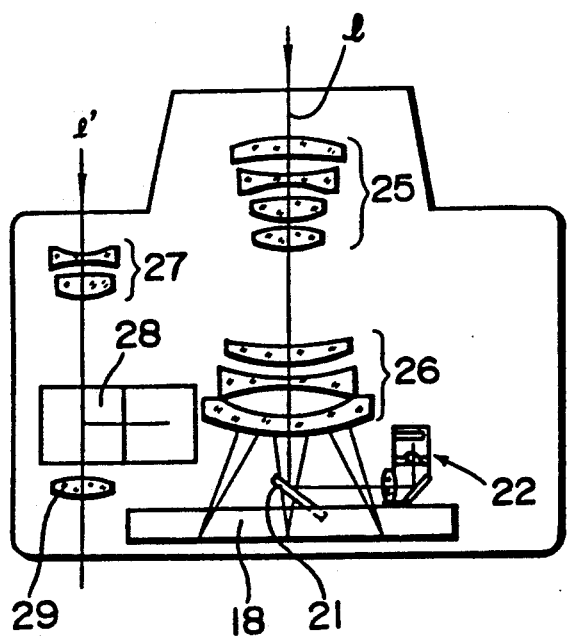
FIG. 4 is a side elevational view of the camera showing an automatic focusing mechanism according to the first embodiment.

FIG. 2 is a view showing a light intercepting shutter 18 positioned immediately forward of a film. The light intercepting shutter 18 prevents a film from being exposed when focus condition detecting operation is performed, which will be described later. The light intercepting shutter 18 comprises a light intercepting shutter supporting plate 18a, four light intercepting shutter blades 19, and an arm 20 for making the shutter blades 19 to move vertically. Describing the light intercepting shutter 18 (hereinafter referred to as shutter 18), the shutter blades 19 thereof are moved upward (opened) and downward (closed) by a link mechanism urged by a magnet (not shown). The mirror 21 rotatably mounted on the shutter blades 19 guides a light which has passed through the lenses 25 and 26 to a focus condition detecting device 22, as shown in FIG. 4. That is, the mirror 21 is positioned in approximately the center of the shutter 18, namely, on the second blade from the bottom so as to guide the light to the focus condition detecting device 22 by reflecting the light which has passed through the lenses 25 and 26 at an angle of 90°. When a focus condition is detected, the mirror 21 projects from the shutter blades 19. When the shutter blades 19 move upward, the lowermost shutter blade thereof moves faster than the other three blades. Therefore, when the shutter blades 19 move upward, the mirror 21 is pressed upward by the upper end of the lowermost shutter blade. As a result, the mirror 21 rotates and is accommodated in the upper portion of the light intercepting shutter supporting plate 18a together with the second blade from the bottom. When the shutter blades 19 move downward after the film is exposed, a spring (not shown) urges the mirror 21 to project toward the front of the camera.

A photometric window 23 is positioned forward of the photometric lens 30. A viewfinder window 24 is positioned forward of the objective lens 27.

Figure 3:
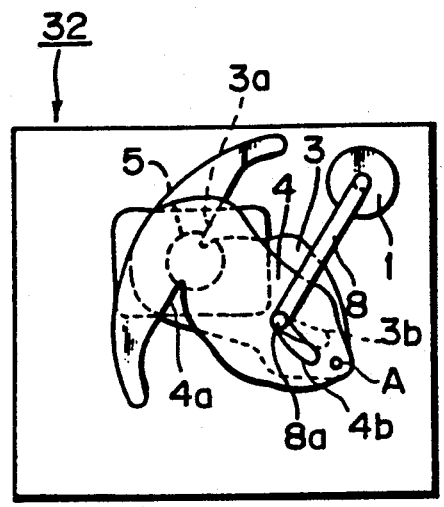
FIG. 3 is an enlarged view of a shutter/diaphragm mechanism according to the first embodiment.

FIG. 3 is an enlarged view of the shutter/diaphragm mechanism 32. The rotation of a first motor 1 is transmitted to an arm 8. A axis 8a provided on a free end of the arm 8 is inserted into elongated openings 3b and 4b of shutter blades 3 and 4, respectively. The shutter blades 3 and 4 are supported by the axis (A) of a base plate so that they are rotatable about the axis (A) and approximately symmetrical with respect to a line formed by connecting the axis (A) and the center of an exposing aperture 5 formed on the base plate. The openings 3b and 4b of shutter blades 3 and 4 extend in a direction different from each other. As described above, the axis 8a is inserted into the openings 3b and 4b. Therefore, when the arm 8 pivots, the axis 8a drives the shutter blades 3 and 4 so that they pivotally move away or pass each other about the axis (A). When V-shaped notches 3a and 4a defined on the shutter blades 3 and 4, respectively pass each other over the aperture 5, the aperture 5 is opened to adjust the diameter of the aperture 5. FIG. 3 shows the aperture 5 which is closed.

FIG. 4 is a side elevational view of the camera body. When the focus condition is detected, a light which has passed through the lenses 25 and 26 along the optical axis 1 thereof is guided by the mirror 21 to the focus condition detecting device 22 which is described later with reference to FIG. 7. In FIG. 4, the left side corresponds to the top of the camera body, the right side corresponds to the bottom thereof, and the upper side corresponds to the front thereof.

Figure 5:
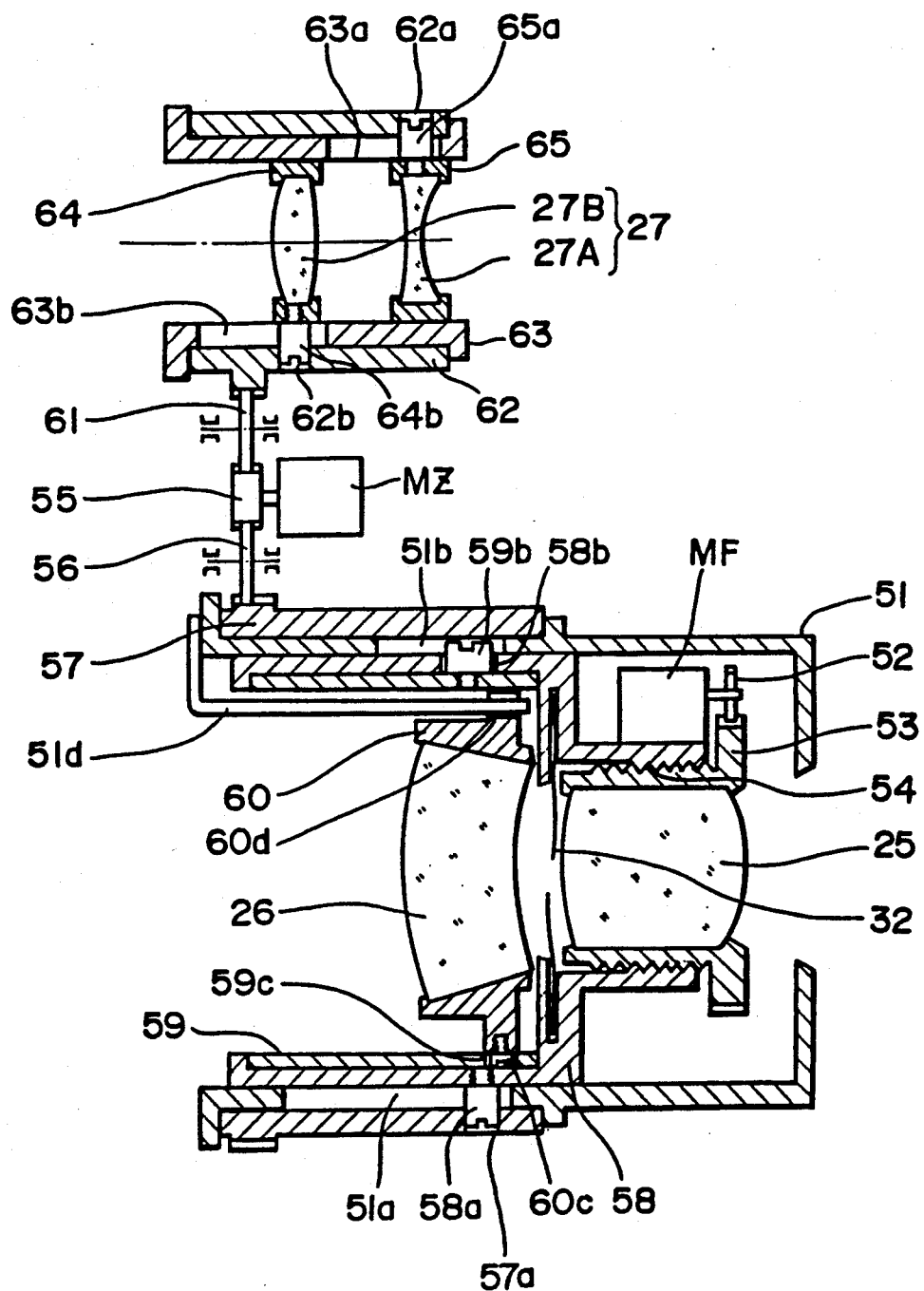
FIG. 5 is a section showing the optical system of the camera according to the first embodiment.

The construction of the lenses 25 and 26 and the zooming operation thereof are described with reference to FIG. 5 hereinbelow.

Focusing of Photographing Lens

The focus condition detecting device 22 calculates a defocus amount, namely, the amount of a photographing lens to be moved from the current position thereof to the position appropriate for bringing an object into the in-focus position. A focusing motor MF is rotated until the photographing lens is moved in the amount corresponding to the defocus amount. That is, when the forward lens supporting barrel 53 is rotated through a gear 52, the barrel 53 is moved by a helicoid 54 forward or backward along the optical axis of the lenses 25 and 26. As a result, the forward lens 25 reaches the in-focus position. The focusing motor MF is fixed on a barrel 83. In order to simplify the figure, the lenses 25 and 26 are shown as a single lens element in FIG. 5.

Zooming of Photographing Lens

When gears 55 and 56 rotate upon energizing of a zoom motor MZ, a zoom cam barrel 57 rotates. The barrel 58 is fitted in a fixed barrel 51 and the cam barrel 57 is fitted over the fixed barrel 51. The fixed barrel 51 has a linear groove 51a, while the cam barrel 57 has a cam groove 57a. The barrel 58 has a pin 58a which passes through the linear groove 51a and is inserted into the cam groove 57a. When the cam barrel 57 is rotated, the pin 58a is driven by the cam groove 57a so that the barrel 58 is linearly moved along the cam groove 57a of the zoom cam barrel 57. At this time, the barrel 53 linearly moves together with the barrel 58, and the backward lens cam barrel 59 around which the barrel 58 is mounted rotates and moves, together with the barrel 58, along the optical axis of the lenses 25 and 26. The cam barrel 59 has a pin 59b which passes through a cam groove 58b formed in the barrel 58 and is inserted in a linear cam groove 51b formed in the fixed barrel 51. Therefore, when the barrel 58 moves along the optical axis, the barrel 59 is rotated due to the engagement of the cam groove 51b and the pin 59b. A backward lens holding barrel 60 is slidably fitted in the barrel 59 and is provided with a pin 60c which is inserted in a cam groove 59c formed in the barrel 59. Further, the fixed barrel 51 has a guide rod 51d extending along the optical axis which passes through an opening 60d formed in the barrel 60. When the barrel 58 is rotated, the barrel 59 moves in an amount corresponding to the amount of the movement of cam barrel 59 along the cam groove 59c in addition to the movement amount of the barrel 58. That is, when the cam barrel 59 rotates together with the barrel 58, the barrel 60 is linearly moved along the optical axis by the combination of the cam groove 59c and the pin 60c. Thus, the lenses 25 and 26 move along the optical axis thereof, so that a zooming is carried out. The shutter/diaphragm mechanism 32 positioned between the lenses 25 and 26 is supported by the barrel 58, thus moving together with the lens 25 during the zooming operation.

Magnification of Viewfinder Lens

Upon energizing of the zoom motor MZ, the gears 55 and 61 rotate. Consequently, a viewfinder cam barrel 62 rotates. The cam barrel 62 is fitted over a fixed barrel 63 in which a positive lens supporting barrel 64 supports the lens 27B and a negative lens supporting barrel 65 supports the lens 27A. The barrel 64 has a pin 64b which passes through a linear cam groove 63b formed in the barrel 63 and is inserted in a cam groove 62b formed in the barrel 62. Similarly to the above, the barrel 65 has a pin 65a which passes through a linear groove 63a formed in the fixed barrel 63 and inserted in a cam groove 62a formed in the barrel 62. Accordingly, When the cam barrel 62 is rotated, the lenses 27A and 27B are moved along the optical axis of the objective lens 27. Thus, the positive lens 27B of the objective lens 27 of the viewfinder changes a magnification of the viewfinder, while the negative lens 27A of the objective lens 27 carries out a diopter correcting in correspondence with the magnification change carried out by the positive lens 27A. Both the finder lens and the photographing lens are driven by the zoom motor MZ. But the movement amount of the finder lens differs from that of the photographing lens because the reduction ratios of the gear of both lenses are different from each other.

Figure 6:
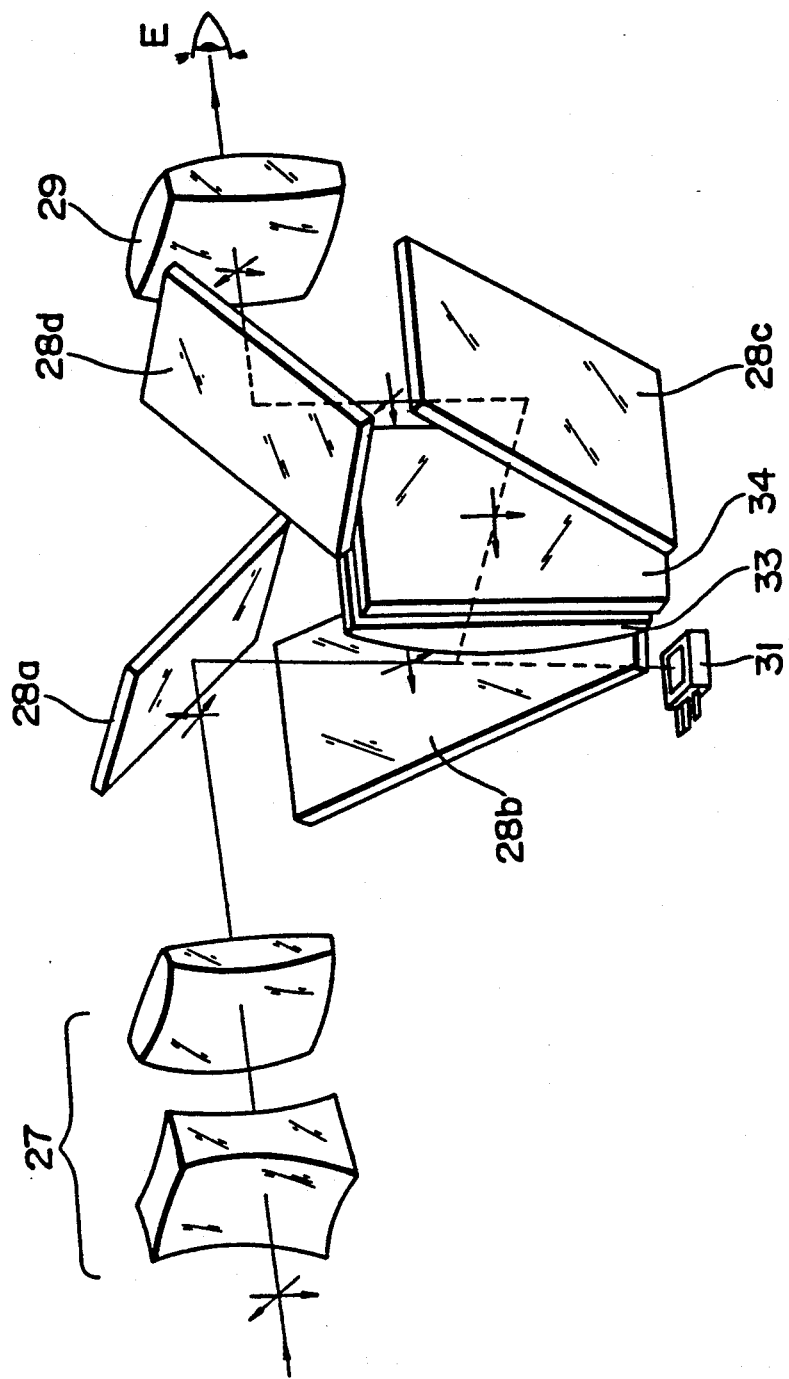
FIG. 6 is a perspective view showing an optical system constituting the viewfinder of a camera according to the first embodiment.

Referring to FIG. 6 showing the Porro mirror 28 composed of four mirrors 28a through 28d, the photometric operation is described hereinbelow. A second mirror 28b is composed as a partial transparent mirror or a semi-transparent mirror. In the case of the partial transparent mirror, the peripheral surface of the second mirror 28b totally reflects lights incident thereon and a transparent portion or an opening is formed in the center thereof. In the case of the semi-transparent mirror, either the entire surface thereof or only the center portion thereof is semitransparent. Part of visible light is reflected thereby toward an eyepiece 29 positioned on the optical axis of the viewfinder and part of the visible lights is incident on the photometric element 31 therethrough. In both cases, visible lights are partially incident on the photometric element 31. If the second mirror 28b is composed as a semi-transparent mirror, preferably, an evaporation layer which reflects an ultraviolet ray is formed over the photometric element 31 so as to eliminate the need for providing the ultraviolet ray intercepting filter forward thereof. Thus, the construction of the photometric section is simple. A visual field frame 34 is positioned at the focal point of the objective lens 27 constituting the zoom lens. A condenser lens 33 is positioned between the second mirror 28b and the visual field frame 34. It is necessary that the photometric element 31 is approximately conjugate to the visual field frame 34. If a first mirror 28a is composed of a semitransparent mirror, the photometric element 31 may be in such a position as to receive a light which has transmitted through the first mirror 28a.

Figure 7:
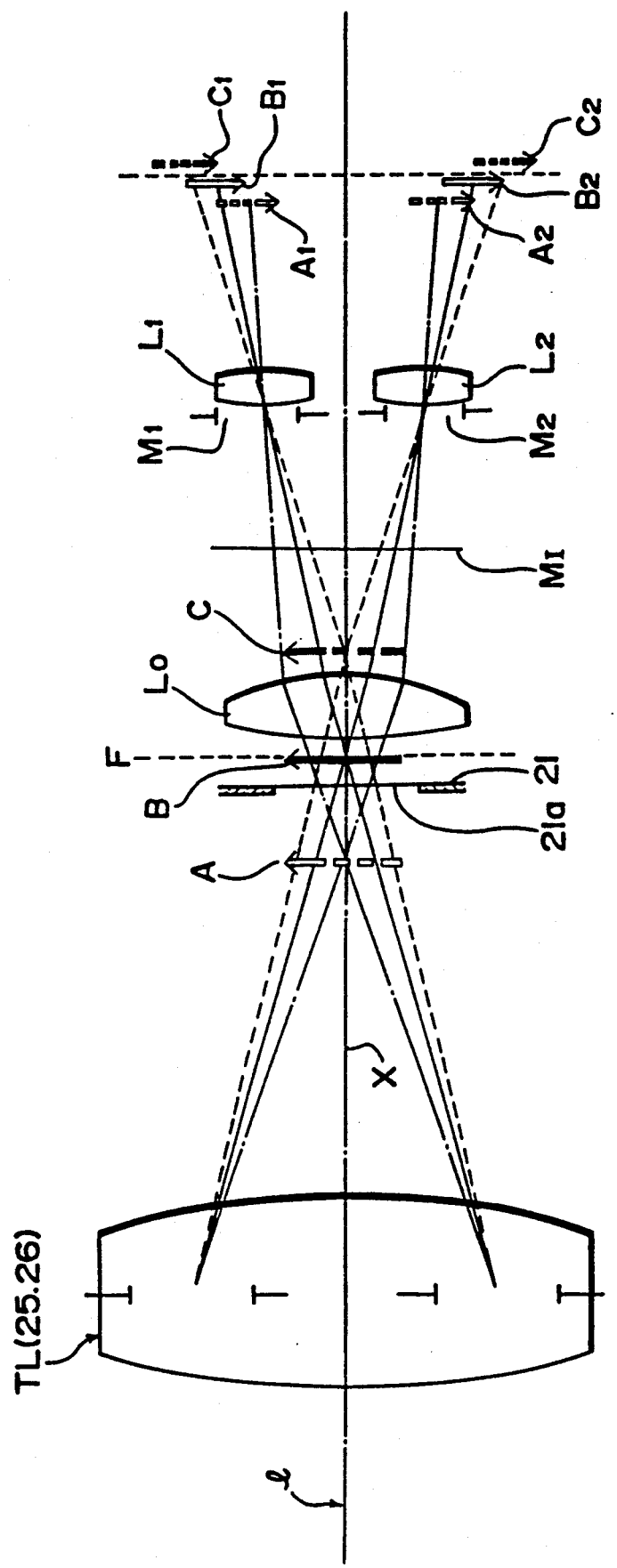
FIG. 7 is an explanatory view for explaining the optical system of a focus condition detecting device of a camera according to the first embodiment.

Referring to FIG. 7, the optical system of the focusing condition detecting device 22 adopting a phase difference detecting system is described hereinbelow. The mirror 21 is positioned forward of a predetermined image forming plane (F) and a rectangular opening 21a which regulates the visual field for detecting the focusing condition is formed on the mirror 21. A condenser lens $L_O$ is positioned backward of the plane (F) of the photographing lens TL (25 and 26). A pair of image reforming lenses $L_1$ and $L_2$ symmetrical with respect to the optical axis l of the lens TL is provided backward of the condenser lens $L_O$. An image formed on the plane (F) by the lens TL is reformed by the lenses $L_1$ and $L_2$. A mirror $M_1$ inclined by 45° with respect to the optical axis l is disposed between the condenser lens $L_O$ and the lenses $L_1$ and $L_2$. Referring to FIG. 4, a light refracted at an angle of 90° by the mirror 21 is further refracted at an angle of 90° by the mirror $M_1$ so that the light is parallel with the optical axis l. Referring again to FIG. 7, reference numerals (A), (B), and (C) denote images formed at a front focus position, at the in-focus position, and at a rear focus position, respectively. The lenses $L_1$ and $L_2$ form images $A_1$, $A_2$; $B_1$, $B_2$; and $C_1$, $C_2$ corresponding to the images A, B, and C as first and second images, respectively. Supposing that the images A, B, and C are formed as upward arrows in FIG. 7, the first and second images corresponding to the images A, B, and C are formed as downward arrows. The interval between the first and second images varies depending on the focus adjusting condition of the photographing lens TL. Based on the output of a array of photometric elements (CCD array) arranged at a position conjugate to the predetermined image forming plane with respect to the lenses $L_1$ and $L_2$ or in the vicinity of the conjugate position, the focus adjusting condition of the lens TL can be detected by detecting the change of the interval between the first and second images, namely, the phase difference between the first and second images. Diaphragm masks $M_1$ and $M_2$ are provided forward of the lenses $L_1$ and $L_2$.

Figure 8:
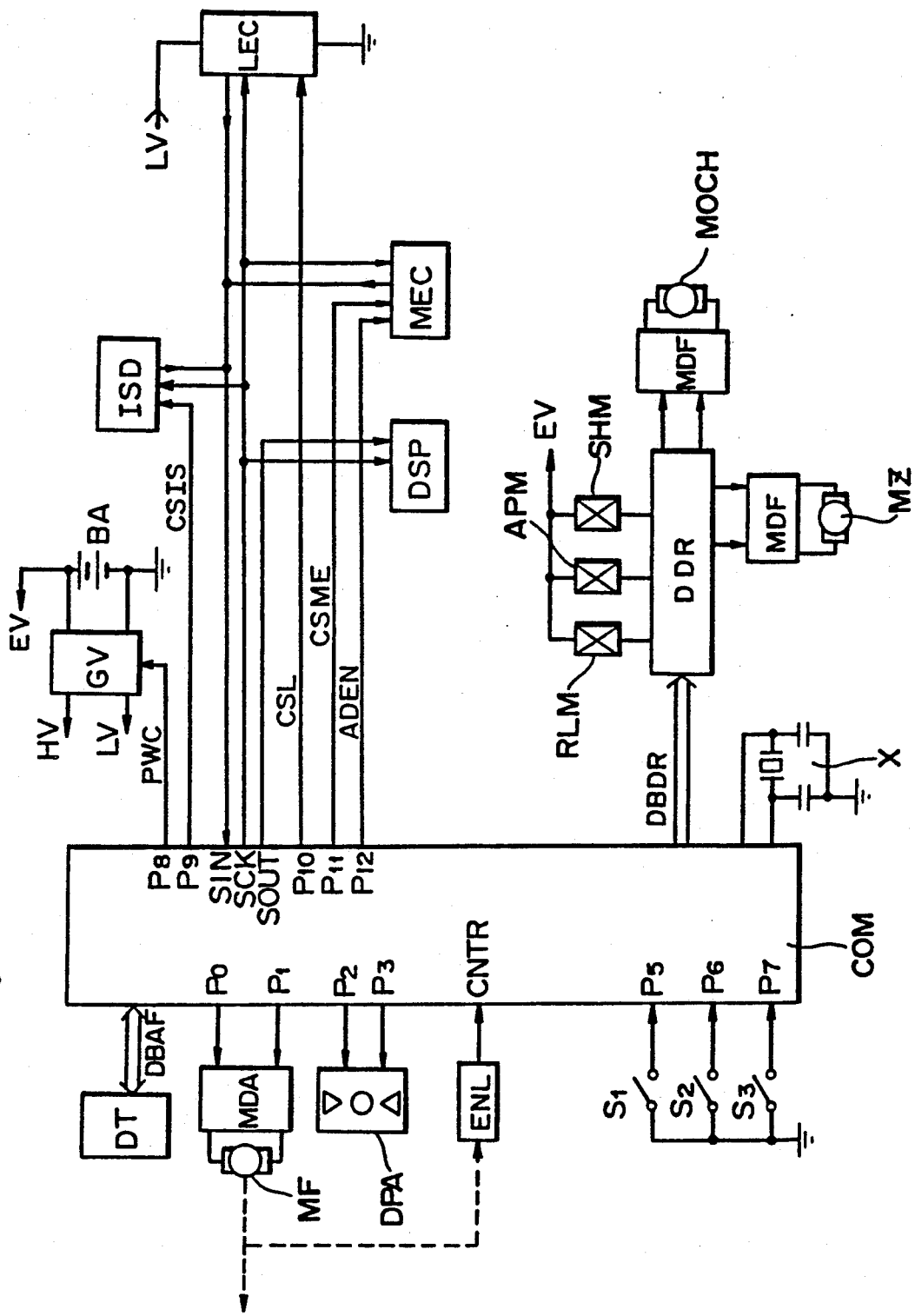
FIG. 8 is a circuit diagram of a camera system according to the first embodiment.

FIG. 8 is a circuit diagram of a camera system to which the present invention is applied. A light receiving section DT for detecting a focusing condition includes the CCD array. The light receiving section DT controls the CCD array and has a function of A/D-converting a signal read out from the CCD array and transmitting an A/D-converted signal to a microcomputer COM through a data bus DBAF. The focusing motor MF is used for an automatic focusing operation. A motor control circuit MDA controls the normal and reverse rotations, braking, and OFF of the motor MF in response to signals transmitted from the microcomputer COM through output ports $P_0$ and $P_1$. A display section DPA displays whether the photographing lens is moved forward or backward, whether or not an infocus condition has been obtained, and gives an alarm indicating that it is impossible to detect a focusing condition. An encoder ENL outputs a pulse corresponding to the movement amount (motor rotational amount) of the photographing lens moved by the motor MF, i.e. motor rotational amount, to an input terminal CNTR for an event counter.

A switch $S_1$ has a function of starting a photographing operation, detecting a focusing condition, and starting a photometric operation. In response to the first stage of depression of the release button, the switch $S_1$ closes, thus outputting a signal to an input port $P_5$ of the microcomputer COM. In response to the subsequent second stage of depression of the release button, a switch $S_2$ closes, thus outputting a signal to an input port $P_6$. A reset switch $S_3$ closes upon completion of an exposure control operation, thus outputting a signal to an input port $P_7$. The reset switch $S_3$ opens upon completion of a film winding.

A power circuit GV operates when the level of a power source control signal PWC outputted from an output port $P_8$ is low. The power circuit GV outputs a high voltage HV and a low voltage LV based on the output of the power battery BA. The high voltage HV serves as the power source of the light receiving section DT. The low voltage LV serves as the power sources of the display section DPA, the encoder ENL, a film sensitivity reading circuit ISD, a lens circuit LEC, a photometric and A/D converting circuit MEC, and a load driving circuit DDR. The power battery BA supplies electricity to the motor control circuit MDA, a motor control circuit MDF, a display circuit DSP, and the microcomputer COM through the power line EV.

The film sensitivity reading circuit ISD reads ISO data of a patrone indicating a film sensitivity, thus serially outputting film sensitivity data to a serial input terminal SIN synchronously with a serial clock SCK outputted from the microcomputer COM when the level of a signal CSIS inputted thereto through an output port $P_9$ becomes low. The lens circuit LEC serially outputs various data stored in the memory thereof to the serial input terminal SIN in synchronization with the serial clock SCK when the level of a signal CSL inputted thereto through an output port $P_{10}$ becomes low.

A display circuit DSP makes a display based on data transmitted from the microcomputer COM. The photometric and A/D converting circuit MEC starts a photometric operation upon start of the electricity supply of the low voltage LV from the power circuit GV and repeats A/D conversions in a constant cycle when the level of an A/D conversion allowance signal ADEN outputted through an output port $P_{12}$ becomes low. When a signal CSME inputted thereto through an output port $P_{11}$ becomes low, data which has been A/D-converted and latched is outputted therefrom to the microcomputer COM in synchronization with the serial clock SCK. The load driving circuit DDR decodes data outputted from the microcomputer COM through a data bus DBDR, thus driving a load based on a decoded result. The load includes a release magnet RLM, a magnet APM for controlling the shutter/diaphragm mechanism 32, a magnet SHM for controlling the light intercepting shutter 18, a motor MOCH for charging the film feeding and exposure control mechanism and the driver MDF thereof, the zoom motor MZ, and the driver thereof. Reference numeral X denotes an oscillator.

Figure 9:
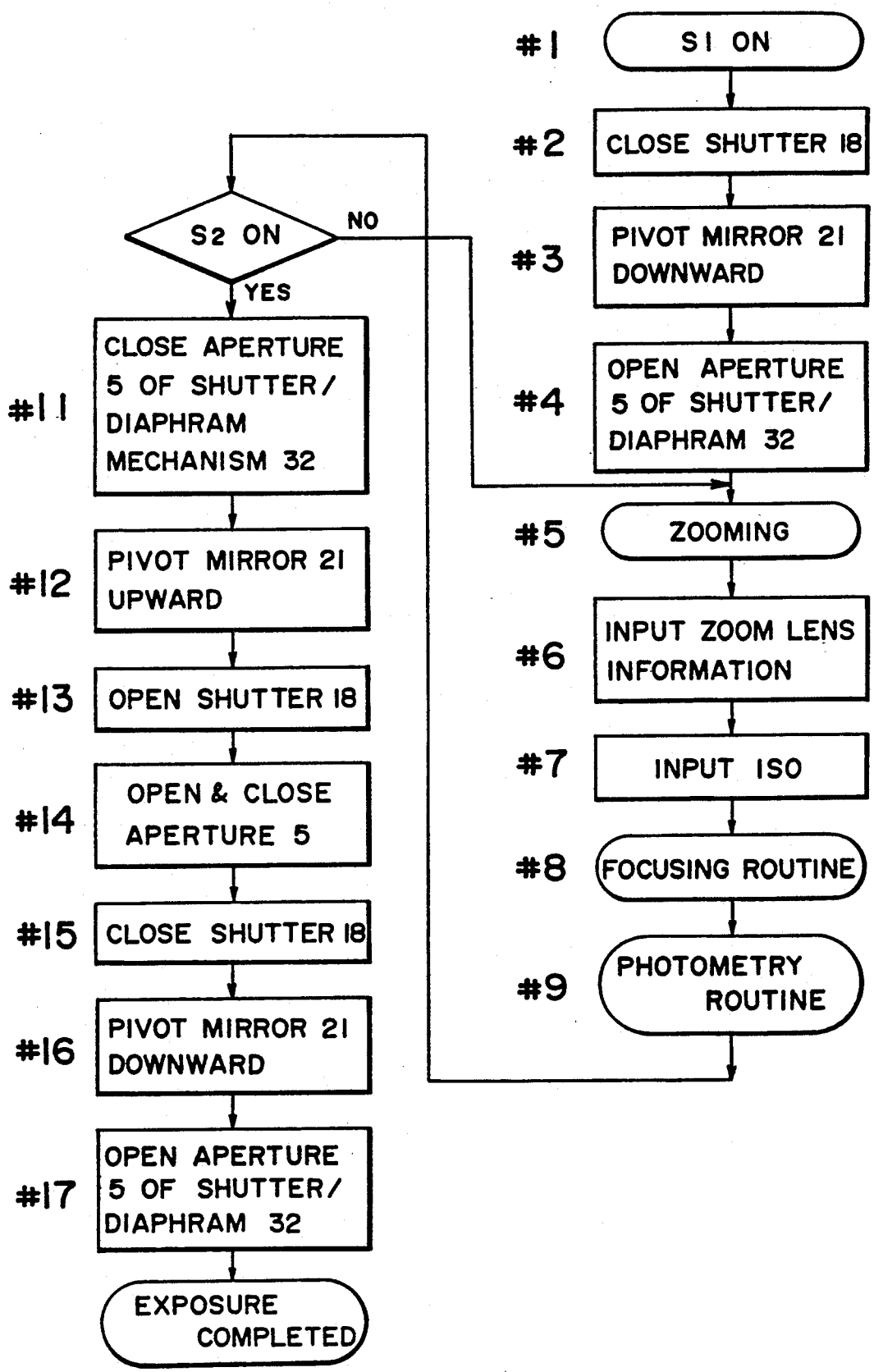
FIG. 9 is a flowchart for describing the exposure operation of a camera according to the fist embodiment.

FIG. 9 is a flowchart showing the operation of the camera according to the embodiment of the present invention. In response to the first stage of depression of the release button at step #1, the switch $S_1$ is turned on. As a result, the camera starts operating. At step #2, the shutter 18 is closed. This operation is performed because no instruction is given in the initial condition and prevents the film from being exposed during the focus condition detecting operation. At step #3, the mirror 21 is pivoted downward, thus projecting from the shutter blades 19. In this condition, a light which has passed through the photographing lens can be guided to the focus condition detecting device 22. At step #4, the aperture 5 of the shutter/diaphragm mechanism 32 is opened so that the light which has passed through the photographing lens enters the shutter/diaphragm mechanism 32. At step #5, a zooming is carried out according to a photographer's desire. At step #6, the information of the zoom lens such as the focal length thereof is inputted to the microcomputer COM. At step #7, a film sensitivity (ISO) is inputted to the microcomputer COM by means of DX code or manually. At step #8, a focusing operation is performed using the light which has passed through the photographing lens. At step #9, photometric information is applied to the microcomputer COM without using the light which has transmitted the photographing lens so as to calculate an aperture value and a shutter speed for obtaining an appropriate exposure. Thus, a preparation for taking a photograph is completed. The switch $S_2$ is turned on when the second stage of depression of the release button is made in this condition. At step #10, it is detected whether or not the switch $S_2$ is ON. If it is decided that the switch $S_2$ is ON, the program goes to step #11. If the switch $S_2$ is OFF, the program returns to step #5. At step #11, the aperture 5 of the shutter/diaphragm mechanism 32 is closed. Thereafter, the mirror 21 is pivoted upward at step #12. At step #13, the shutter 18 is opened so that the film can be exposed. At step #14, the shutter blades 3 and 4 are pivoted to adjust the size of the aperture 5 of the shutter/diaphragm mechanism 32 so that the aperture value and the shutter speed previously calculated are obtained. After the film is appropriately exposed, at step #15, the light intercepting shutter 18 is closed. At steps #16 and #17, an operation similar to that performed at steps #3 and #4 is carried out to prepare the following photographing operation. Thus, a series of exposures are completed.

A second embodiment of the present invention is described hereinbelow.

Figure 10:
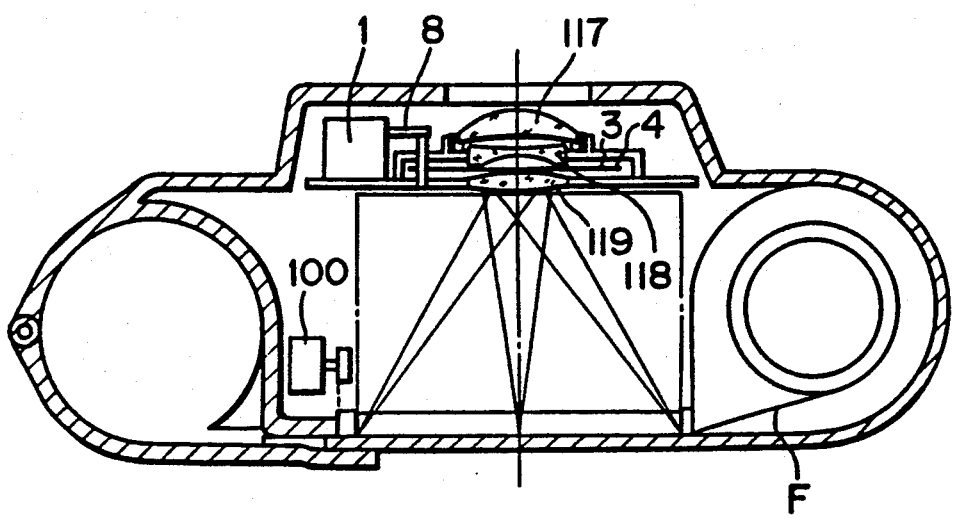
FIG. 10 is a section, viewed from the above, showing the internal construction of a camera according to a second embodiment of the present invention.

FIG. 10 is a plan view showing the inside of a camera. Lenses denoted by reference numerals 117, 118, and 119 compose a triplet photographing lens. The lenses 118 and 119 are fixed to the lens barrel and the shutter blades 3 and 4 are positioned between the lenses 118 and 119. The lens 117 is supported by a fan-shaped gear 7 in the center thereof shown in FIGS. 11 and 13. The lens 117 moves along the optical axis thereof, thus performing the focusing operation.

Figure 11:
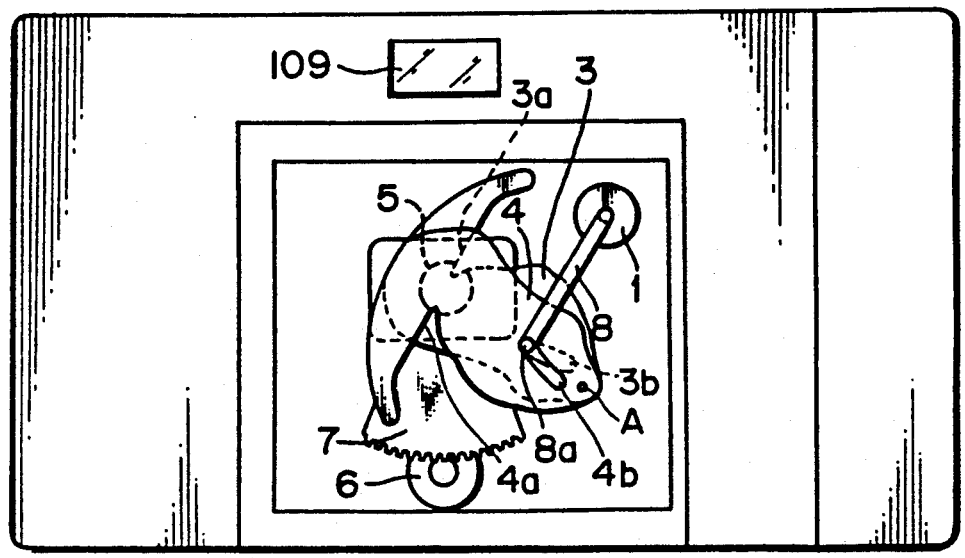
FIG. 11 is a front view showing the shutter section of the camera according to the second embodiment.

FIG. 11 is a front view of the camera body. The construction of the shutter/diaphragm mechanism of the camera is similar to that of the camera of the first embodiment shown in FIG. 3. Therefore, the detailed description thereof is omitted herein. It is noted that a viewfinder 109 is positioned at a position remote from the optical axis of the photographing lens.

Figure 13:
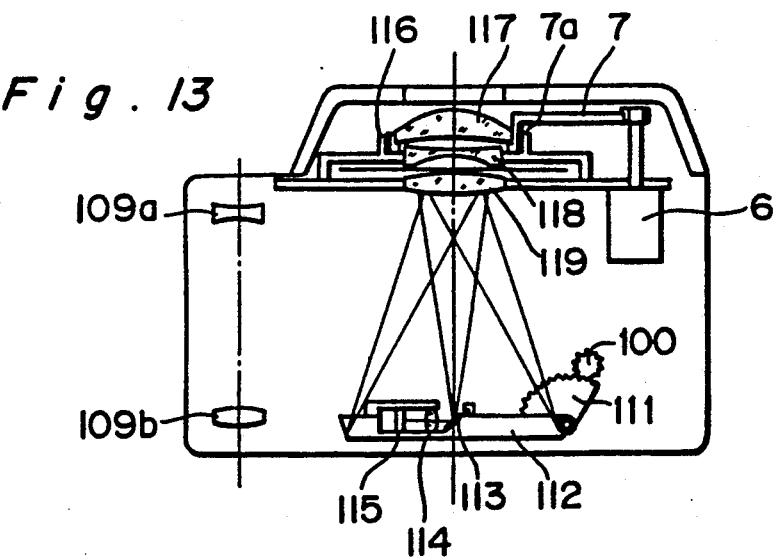
FIG. 13 is a side elevational view of the camera according to the second embodiment showing the internal construction thereof.
Figure 12:
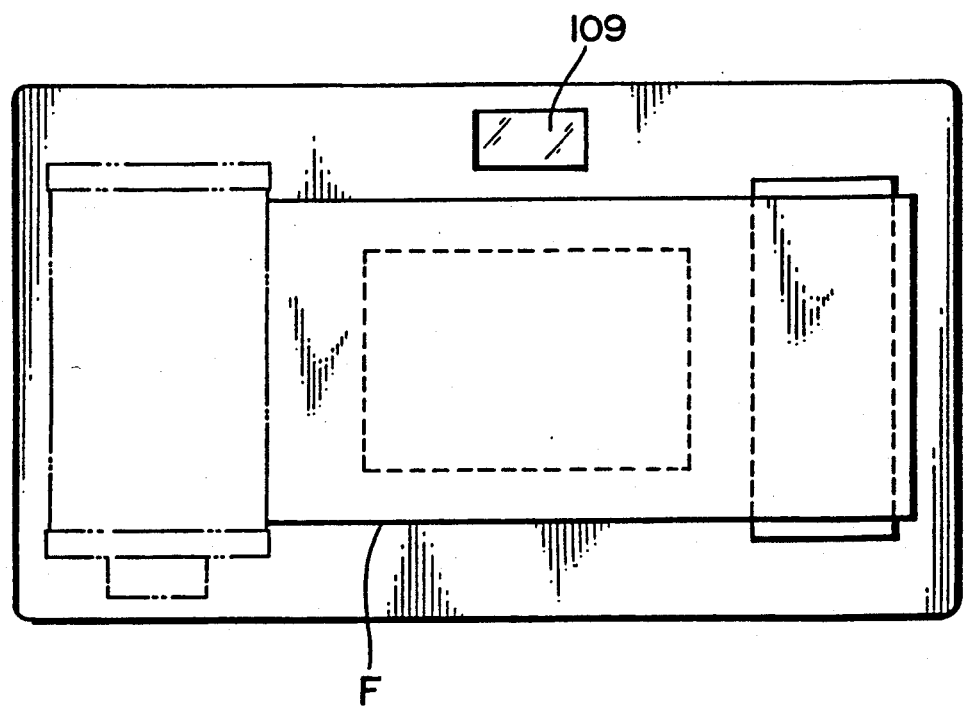
FIG. 12 is a view, showing the rear side of the camera according to the second embodiment, a film being loaded.

FIG. 12 is a rear view of the camera in which film is loaded. FIG. 13 is a side elevational view of the camera body. The left side corresponds to the top of the camera and the right side corresponds to the bottom thereof. An inverted Galileo viewfinder is composed of a negative lens 109a serving as an objective lens of the viewfinder 109 and a positive lens 109b serving as an eyepiece thereof. The optical axis of the viewfinder is positioned above the optical axis of the photographing lens and parallel therewith. A second motor 6 is used to perform the focusing operation. The rotation of the second motor 6 is transmitted to the fan-shaped gear 7. A lens frame 116 is helicoidal, so that the gear 7 rotates on the lens frame 116 along the optical axis of the photographing lens with an end 7a thereof in engagement with the lens frame 116. Thus, the lens 117 supported by the fan-shaped gear 7 is moved along the optical axis, thereby performing the focusing operation. A third motor 100 drives a light intercepting shutter 112 positioned immediately before the film when an exposure is carried out. The shutter 112 prevents a light from being incident on the film when a focusing operation is carried out. A fan-shaped gear 111 drives the shutter 112, that is, the shutter 112 pivots along the plane including the optical axis of the photographing lens in the range between the light intercepting position shown in FIG. 13 and a move-away position shown in FIG. 14. The focus condition detecting device interlocked in the shutter 112 comprises a mirror 113, a lens 114, and a CCD array 115. The mirror 113 reflects a light traveling along the optical axis by 90° upward (left side in FIG. 13). The lens 114 condenses the light so as to guide the light to the CCD array 115.

Figure 14:
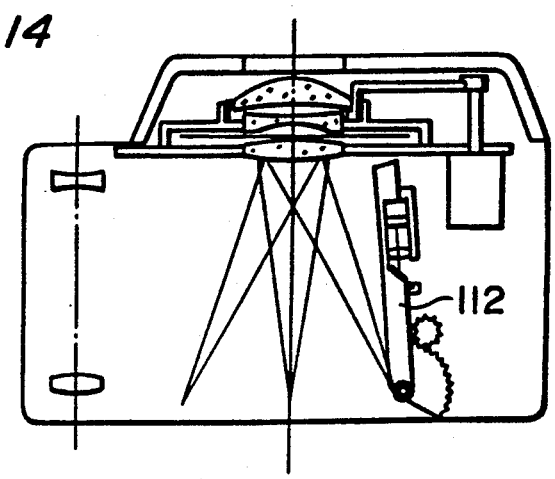
FIG. 14 is a view, similar to FIG. 13, showing the exposing state of the camera.

Next, the photographing operation is described with reference to FIGS. 13 and 14. The shutter blades 3 and 4 are pivoted away from each other to fully open the aperture 5 when the switch $S_1$ of an electric circuit (not shown) is turned on. Thus, a light which has passed through the photographing lens reaches the CCD array 115, and the focus condition detecting device measures the focus condition. Next, the lens 117 moves to a predetermined focusing position in response to a signal outputted from the focus condition detecting device. When the switch $S_2$ (not shown) is turned on in response to the second stage of depression of the release button, the shutter blades 3 and 4 are driven to approach to each other to close the aperture 5. Then, the light intercepting shutter 112 rotates to move to the move-away position at which it does not interfere with the light which has passed through the photographing lens as shown in FIG. 14. Thereafter, the shutter blades 3 are moved away from each other to open the aperture 5 so as to expose the film. Then, the aperture 5 is closed. Then, the light intercepting shutter 112 returns to the initial position as shown in FIG. 13. Thus, the exposure is completed.

The photometric device is now considered. The camera according to the embodiments described above is of a type of non-TTL system in regard to the photometry, similarly to the known compact camera. However, when a photographing lens is of a zoom lens with a high magnification, an error in a photometric value is great in the non-TTL system. That is, when a zooming is carried out, a photographing range, or an angle of field varies. Therefore, a photometric value should be varied. If a zooming range is small, the variation of the photometric value is so small that it can be ignored. But if a zooming is carried out in a high magnification, the photographing range greatly varies so that a photometric value should be greatly varied. Therefore, precise measurement of the photometric value can not be available in the non-TTL system.

Figure 15A:
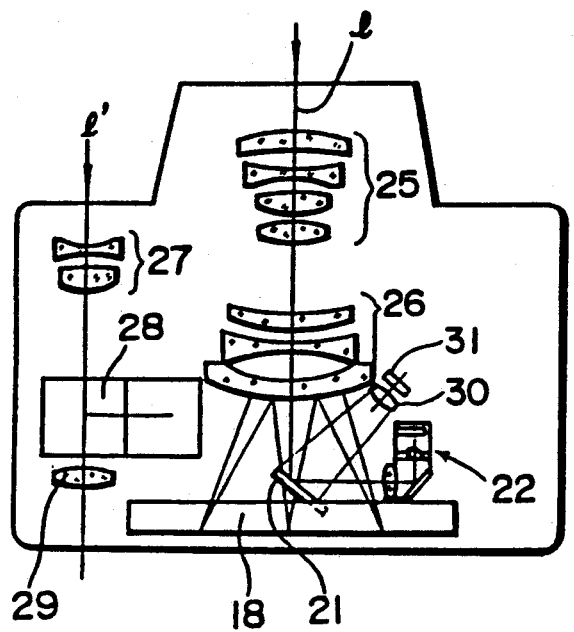
FIG. 15A is a side elevational view of the camera showing an automatic focusing mechanism according to a third embodiment.
Figure 15B:
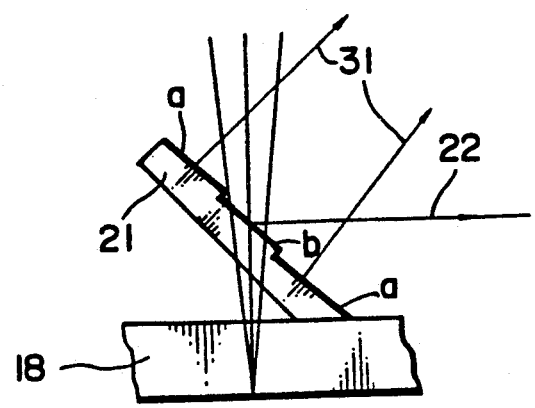
FIG. 15B is an enlarged view of a reflecting mirror shown in FIG. 15A.

Accordingly, third embodiment of the present invention is provided here and described with reference to FIGS. 15A and 15B. In the third embodiment, the photometric device of the first embodiment is modified to a type of TTL system. The construction of the camera of FIG. 15A, a side elevation of the camera, is a modification of that of FIG. 4. The difference therebetween is that the third embodiment includes a photometric lens 30 and a photometric element 31 in addition to the optical members of the first embodiment of FIG. 4. FIG. 15B is a partially enlarged view of the mirror 21 to describe how it reflects lights. The path in carrying out a photometric operation is described with reference to FIG. 15B. The center section (b) of the mirror 21 forms at an angle of 45° with the optical axis 1 of the photographing lens. Lights reflected by the mirror 21 at the center section (b) thereof are guided to the photometric element 22. Lights diffused by the mirror 21 at other sections (a) are guided to the photometric element 31. In this example, the mirror 21 is so constructed that lights which have passed through the photographing lens are partly guided to the focus condition detecting device and partly guided to the photometric system. It is possible to guide the beams to both systems by a time division using a movable mirror, a lens or the like, a wave surface division using a slit mirror, a defraction grating or the like, and a signal division for processing signals outputted from the same element.

Similarly to the first embodiment, it is possible to provide the camera according to the first embodiment with a photometric device of the TTL system.

Although the present invention has been fully described in connection with the preferred embodiments thereof with reference to the accompanying drawings, it is to be noted that various changes and modifications are apparent to those skilled in the art. Such changes and modification are to be understood as included within the scope of the present invention as defined by the appended claims unless they depart therefrom.

What is claimed is:

1. A camera comprising:
    a photographing optical system including photographing lenses capable of performing zooming;
    a viewfinder optical system composed of an optical system different from those of said photographing lenses;
    photometric means, having an optical system different from those of said photographing lenses, for performing a photometry of an object; and
    focus condition detecting means for detecting the focus condition of the object based on a light which has passed through said photographing lenses.

2. A camera as claimed in claim 1, wherein said viewfinder optical system is of a real image type.

3. A camera as claimed in claim 2, wherein said viewfinder optical system serves as that of said photometric means.

4. A camera as claimed in claim 1, wherein said viewfinder optical system is capable of carrying out zooming in correspondence with the zooming of said photographing lenses.

5. A camera as claimed in claim 1, wherein said photographing optical system comprises a between lens shutter and a light intercepting shutter is provided between said photographing lenses and a film to be installed in said camera so as to intercept light when said between lens shutter is opened.

6. A camera as claimed in claim 5, wherein said light intercepting shutter is provided with reflecting means for guiding light, which has been reflected by the object and passed through said photographing lenses, to said focus condition detecting means.

7. A camera as claimed in claim 6, wherein said light intercepting shutter moves away from the photographing path before when an exposure is carried out.

8. A camera as claimed in claim 7, wherein said light intercepting shutter moves away from the photographing path by the movement thereof in the direction perpendicular to an optical axis of said photographing lenses.

9. A camera as claimed in claim 8, wherein said light intercepting shutter pivots in a plane including the optical axis of said photographing lenses in the range between the light intercepting position and the move-away position.

10. A camera as claimed in claim 1, wherein said focus condition detecting means detects a focus condition based on a phase difference between two images formed by lights which have passed through said photographing lenses.

11. A camera comprising:
    a photographing optical system including photographing lenses capable of performing zooming;
    a viewfinder optical system composed of an optical system not including said photographing lenses;
    photometric means for measuring the brightness of the object based on the light which has passed through said photographing lenses;
    focus condition detecting means for detecting the focus condition of the object based on a light which has passed through said photographing lenses; and
    means, disposed in front of a film, for guiding the light which has passed through said photographing lenses to said photometric and focus condition means.

12. A camera as claimed in claim 11, wherein said viewfinder optical system is of a real image type.

13. A camera as claimed in claim 11, wherein said viewfinder optical system is capable of carrying out zooming in correspondence with the zooming of said photographing lenses.

14. A camera as claimed in claim 11, wherein said photographing optical system comprises a between lens shutter and a light intercepting shutter is provided between said photographing lenses and a film to be installed in said camera to as to intercept light when said between lens shutter is opened.

15. A camera as claimed in claim 14, wherein said guiding means is disposed on said light intercepting shutter.

16. A camera as claimed in claim 15, wherein said light intercepting shutter moves away from the photographing path before when an exposure is carried out.

17. A camera as claimed in claim 16, wherein said light intercepting shutter moves away from the photographing path by the movement thereof in the direction perpendicular to an optical axis of said photographing lenses.

18. A camera as claimed in claim 17, wherein said light intercepting shutter pivots in the plane including the optical axis of said photographing lenses in the range between the light intercepting position and the move-away position.

19. A camera as claimed in claim 11, wherein said focus condition detecting means detects a focus condition based on a phase difference between two images formed by lights which have passed through said photographing lenses.

20. A camera comprising:
a photographing optical system including photographing lenses and a between lens shutter;
a viewfinder optical system composed of an optical system different from those of said photographing lenses;
focus condition detecting means for detecting the focus condition of an object based on a light which has passed through said photographing lenses; and
a light intercepting shutter provided between said photographing lenses and a film to be installed in said camera so as to intercept light when said lens shutter is opened;
said light intercepting shutter being provided with reflecting means for guiding a light, which has been reflected by the object and passed through said photographing lenses, to said focus condition detecting means, and being so designed as to move away from the photographing path by the movement thereof in the direction perpendicular to the optical axis of the photographing lenses when an exposure is carried out.

21. A camera as claimed in claim 20, wherein said reflecting means provided on said light intercepting shutter is a mirror.

22. A camera as claimed in claim 20, wherein said focus condition detecting means detects a focus condition based on a phase difference between two images formed by lights which have passed through said photographing lenses.

* * * * *